United States Patent [19]

Nikolaus

[11] Patent Number: 4,813,234
[45] Date of Patent: Mar. 21, 1989

[54] HYDRAULIC TRANSMISSION
[75] Inventor: Heinrich Nikolaus, Hamburg, Fed. Rep. of Germany
[73] Assignee: Mannesmann Rexroth GmbH, Lohr, Fed. Rep. of Germany
[21] Appl. No.: 65,187
[22] Filed: Jun. 19, 1987

Related U.S. Application Data

[63] Continuation of Ser. No. 710,023, Mar. 11, 1985, abandoned.

[30] Foreign Application Priority Data

Mar. 15, 1984 [DE] Fed. Rep. of Germany ....... 3409566

[51] Int. Cl.$^4$ .............................................. B60K 9/00
[52] U.S. Cl. ....................................... 60/484; 60/414; 60/486; 417/223; 192/85 A
[58] Field of Search .......................... 60/414, 484, 486; 417/223, 426, 429; 192/34, 85 A

[56] References Cited

U.S. PATENT DOCUMENTS

| | | | |
|---|---|---|---|
| 3,092,970 | 6/1963 | Sampietro | 60/484 X |
| 3,261,421 | 7/1966 | Forster et al. | 60/484 X |
| 3,421,389 | 1/1969 | Fauchere | 60/484 X |
| 3,509,721 | 5/1970 | Crawford | 60/484 X |
| 4,204,405 | 5/1980 | Basham | 60/414 X |
| 4,215,545 | 8/1980 | Morello et al. | 60/414 X |
| 4,351,409 | 9/1982 | Malik | 60/414 X |

OTHER PUBLICATIONS

Olhydraulik u. Pneumatik, 1980, No. 7, p. 525.

Primary Examiner—A. Michael Chambers
Assistant Examiner—John C. Fox
Attorney, Agent, or Firm—Harness, Dickey & Pierce

[57] ABSTRACT

A hydraulic transmission, in particular for an automotive drive system including a combustion engine comprises at least a pair of hydrostatic pumps and at least a pair of hydrostatic motors each pump and/or motor having the same size or different size with a constant or adjustable through-put. Automatically actuated clutches are provided to connect the pumps to the engine and to connect the motors to a load. A variety of transmission ranges is obtained by activating selected ones of the individual pumps and motors by actuating corresponding clutches. Therefore, the combustion engine may be operated under conditions in which fuel comsumption is as low as possible.

8 Claims, 4 Drawing Sheets

HYDRAULIC TRANSMISSION

This is a continuation of U.S. patent application Ser. No. 710,023, filed Mar. 11, 1985, now abandoned.

BACKGROUND OF THE INVENTION

For varying the load torques and the speed of a driven system, in particular of a system for driving a vehicle, it is desired to operate the combustion engine under nearly constant conditions, wherein energy not transmitted to the wheels during a steady operation of the vehicle is received in an accumulator which supplies energy for an increased demand when the vehicle is to be accelerated. The accumulator is additionally used to receive energy which may be recovered in braking the vehicle.

According to a conventional system, the combustion engine is coupled to a free-wheel accumulating energy generated by the combustion engine under optimum conditions of operation and supplying energy to the vehicle through a hydrostatic transmission when desired. Energy recovered in braking may be supplied to the free-wheel as well Such system suffers from substantial drawbacks, for example, the free-wheel losses are highest with maximum speed and when the vehicle is stopped.

Another conventional transmission ("Ölhydraulik und Pneumatik", 1980 No. 7, page 525) comprises a power branching system, wherein a hydrostatic transmission to optimize the acceleration and deceleration of the vehicle and a mechanical transmission in parallel are provided to optimize the gear transmission efficiency at steady speed. The hydrostatic transmission comprises a clutch each for the input and output., while the mechanical transmission comprises a further clutch. The particular ratio desired may be selected by actuating the clutches. Furthermore, the machines of the hydrostatic transmission are adjustable in throughput to additionally vary the acceleration and deceleration.

SUMMARY OF THE INVENTION

It is an object of the invention to improve a hydraulic transmission system to substantially increase the overall efficiency. It is an further object to operate the drive engine in a condition of saving energy as much as possible. A still further object is to economically accumulate and redeliver the brake energy. It is a particular object of the invention to provide a vehicular drive system including a combustion engine which is operated in a working range in which the fuel consumption is at an optimum in order to save fuel.

According to the invention there is provided a hydraulic transmission, in particular for an automotive drive system, comprising a plurality of hydrostatic machines including a primary unit driven by a drive engine to supply fluid to a pressure line, a hydraulic accumulator and a secondary unit connected to said pressure line, said secondary unit operating as a motor for driving a load or as a pump driven by said load to recover energy, the improvement comprising at least a pair of hydrostatic pumps to define said primary unit and at least a pair of hydrostatic machines to define said secondary unit, a hydraulic line common for said primary and secondary machines and a number of clutches to couple selected ones of said machines to said drive engine and to said load, wherein activating said clutches to connect or to disconnect said primary pumps takes place in response to the performance of said drive engine and activating said clutches to connect or to disconnect said secondary machines takes place in response to a voluntarily manually selected signal.

Thus the transmission is subdivided in at least a pair of transmission branches which both comprise hydrostatic machines connected to a common hydraulic pressure line. The pumps or motors, respectively to put in operation are mechanically activated through automatically activated clutches, while any machines not needed are disconnected to avoid losses at idle speed as well as dragging losses. The actuation of a clutch automatically takes place in response to the pressure in the hydraulic line, further in response to the speed of the drive engine, further in response to a voluntarily actuated drive lever or in response to a combination of one or a plurality of such parameters.

According to the invention there is a substantially saving of energy. When a combustion engine is used to drive a vehicle, all requirements to properly drive the load may be met in such way that the speed of the combustion engine can be maintained at a nearly constant fuel saving speed value. Accordingly the power output of the combustion engine is closely held in a range of optimum fuel consumption.

BRIEF DESCRIPTION OF THE DRAWINGS

A variety of embodiments of the invention is described below with reference to the accompanying drawing.

DETAILED DESCRIPTION

Figure 1:
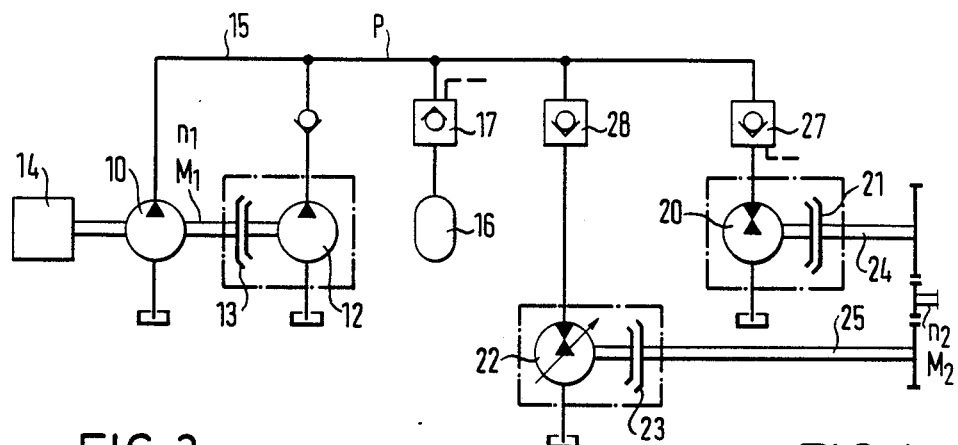
FIG. 1 diagrammatically shows a hydrostatic transmission according to a first embodiment.

Referring to FIG. 1 a pair of hydrostatic pumps 10 and 2 each having a constant displacement volume is driven by a combustion engine 14. Pump 12 is provided with a clutch 13. Both pumps 10 and 12 supply fluid from a reservoir to a hydraulic pressure line 15 to which a hydraulic accumulator 16 and a pair of hydrostatic machines 20 and 22 each with constant displacement volume are connected. The machines may be connected each by a clutch 21 and 23 to an output shaft 24 and 25, driving the axis of a vehicle not shown through a differential gear. The accumulator 16 and the machines 20 and 22 each are connected to the pressure line 15 through pilot operated valves 17, 27 and 28.

Basically the size of the secondary machines 20 and 22 for driving conditions are selected such that the machine 20 operating as a motor delivers a sufficient for a steady driving performance of the vehicle whereas the machine 22 is selected to deliver the increased demand of energy when the vehicle is accelerated. For example it is assumed that the size, i.e. the displacement volume of the machine 20 is substantially smaller than the displacement volume of the machine 22 delivering the accelerating torque. To avoid losses under idling conditions, in particular hydraulic dragging losses, the machines 20 and 22 are deactivated by disengaging the clutches 21 and 23 as long as the output is not needed.

Depending on the power requirement of the motors 20 and 2, the primary pump 12 is activated by engaging the clutch 13. As an example it is assumed again that the size and thus the displacement volume of the pumps 10 and 12 is different.

The full power in accelerating the vehicle when the motor 22 is activated, must be not delivered by the pumps alone. Rather, the accumulator 16 delivers additional energy for accelerating. Furthermore, the accumulator 16 compensates for pressure variations occuring in actuating the clutches. Moreover, the accumulator stores the brake energy when the vehicle is decelerated with the vehicle driving the machines 20 and 22 to supply fluid to the accumulator 16 when working as pumps.

The clutches to activate the primary and secondary units are controlled to allow the combustion engine 14 operating in a range of optimum fuel consumption in which the speed $n_1$ as well as the driving torque $M_1$ are held nearly constant. For example, the pump 10 feeds fluid to the line 15 and the pump 12 is disconnected. When there is more need for fluid, since torque is needed for accelerating the vehicle, the pressure P in the line 15 is reduced. As the pump 10 feeds fluid against a lower pressure P the pump needs less drive torque i.e. the drive torque $M_1$ of the combustion machine drops. To avoid this, the second pump 12 is activated through the automatic clutch 13 to increase the drive torque $M_1$ of the combustion engine. Therefore the pressure P in the line 15 increases to cover the fluid demand of the motor for accelerating the vehicle. The pump 12 is again deactivated when the pressure P increases such that the torque $M_1$ delivered by the combustion engine becomes too large.

With the embodiment of FIG. 1 there are provided six gear steps by selectively activating the motor 20, the motor 22 or both motors 20 and 22, wherein the fluid is supplied either by pump 10 or by both pumps 10 and 12. The size of the pumps and motors is determined according to the acceleration and deceleration of the vehicle as well as according to the steady driving condition with different speeds so that each machine may operate in its optimum range of efficiency when activated. Preferably, at least pumps 10 and 12 have a constant displacement volume. To better meet the drive conditions, the motor 20 and 22 preferably have an adjustable throughput. Depending on selecting the proper size of the machines, controlling the clutches and disconnecting the machines not needed, the overall efficiency of the hydrostatic transmission may be held at an optimum to operate the combustion engine with constant speed and constant torque to decrease the fuel consumption.

Figure 2:
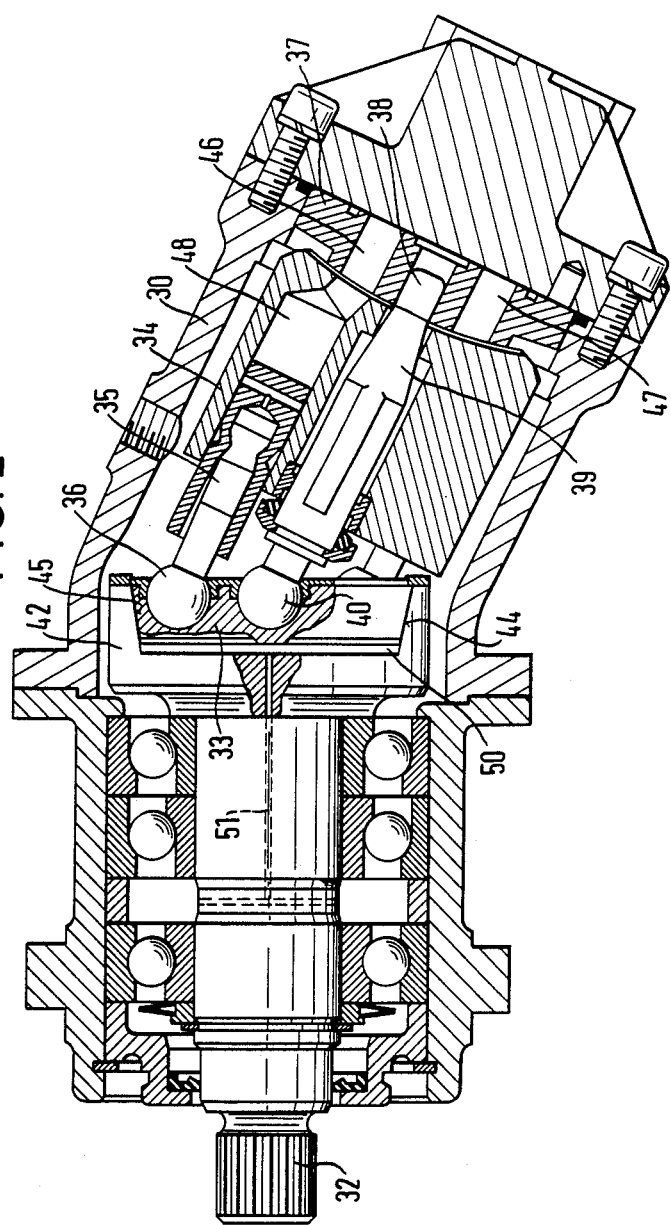
FIG. 2 is a sectional view of an axial piston machine of the bent axis type including a clutch, FIG. 3 diagrammatically shows a primary pump including a valve for activating the clutch, FIG. 4 diagrammatically shows a secondary machine including valves for actuating the clutch, FIG. 5 diagrammatically shows a secondary machine including valves for activating the clutch in a four-quadrant-operation of the machine, FIG. 6 diagrammatically shows a hydrostatic transmission according to a further embodiment.

FIG. 2 shows an embodiment of a hydrostatic machine with an integral clutch. A drive shaft 32, a swash plate 33, a cylinder drum 34 comprising a plurality of pistons 35 and rods 36 having spherical ends, and a control plate 37 are located in a housing 30. The cylinder drum 34 including the pistons 35 is located under an angle with respect to the shaft axis. The swash plate 33 is pivotally connected to the drum 34 via the piston rods 35.

The cylinder 34 is rotatably supported on a central pin 38 having an extension 39 ending in a ball shaped head 40 which is centrically received in the swash plate 33. The swash plate 33 in combination with the shaft flange 42 integrally formed at the drive shaft 32 define a conical friction clutch. Accordingly the drive flange 33 is provided with an external conical surface 44 cooperating with an internal conical surface 45 of the flange 42.

In the pumping mode, fluid from a reservoir enters the cylinder bores 48 through an inlet port 46 in the control plate 37, the fluid then being compressed by the pistons 35 and fed through an outlet port 47 to the hydraulic line 15 shown in FIG. 1.

The clutch engaging force is produced by the hydraulic forces acting on the pistons 35. When the outlet port 47 has no pressure, there are no reaction forces to hold the clutch in engagement so that the clutch is disengaged, separating the flange 33 and shaft 32. However, with pressure prevailing in the bores 48, the clutch is engaged and the drive flange connected to the shaft.

A clutch space 50 is provided between the flange 42 and the drive flange 33 which space is ventilated through a bore 51.

The tapering angle of the clutch must be determined such that the conical face is not self-locking and that a slip is avoided. With an angle too small, there is self-locking and with the angle too large the torque cannot be transmitted so that the clutch slips. A spring not shown may be provided to produce a certain disengaging force of the clutch.

Figure 3:
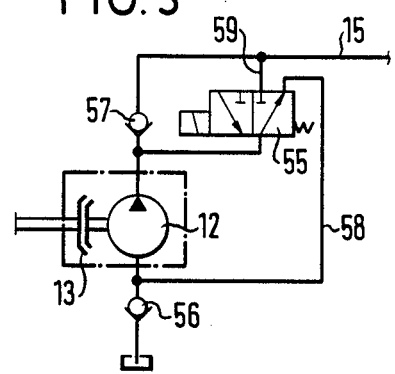

The mode of engaging and disengaging the clutch is explained in referring to FIG. 3. The clutch 13 is actuated by a 3/2-directional solenoid valve. The pump 12 is connected through a check valve 56 and 57 each opening in the direction of flow to the reservoir, or, respectively to the line 15. As long as the pump 12 delivers fluid to the line 15, the clutch 13 is engaged by the hydraulic piston forces. For disengaging the valve 55 is switched to the position shown in which the outlet and inlet of the pump 12 are connected through line 58 i.e. the pump is operated in bypass. Accordingly the pressure difference between the outlet and inlet drops, the force maintaining the clutch in the engaged position is reduced until it drops below the drive torque. From then the clutch mechanically slips so that the pressure difference between the inlet and outlet of the pump is further reduced until the clutch is fully disengaged and the pump stops.

To engage the clutch, the solenoid of the valve 55 is shut off to switch the valve to the other position in which the outlet of the pump 12 is connected to the line 15 through the valve. Accordingly the pistons of the pump are engaged with pressure from the line 15 through the branch line 59 to engage the clutch. As soon as the pump is sped up to the speed of the combustion engine, fluid is supplied through the check valve 57 now open to the line 15.

Figure 4:
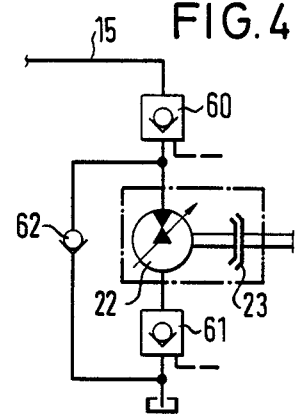

A suitable arrangement for actuating the clutch 23 of the secondary motor 22 is shown in FIG. 4. The inlet of motor 22 is connected through a pilot operated valve 60 to the line 15 and the outlet through a pilot operated valve 61 to the reservoir. During motor operation, both valves 60 and 61 are open and the clutch 23 is automatically engaged by the hydraulic pressure forces. For disengagement the valve 60 is first closed. Since the motor 22 is still driven from the load, fluid is supplied to the reservoir via the valve 61. By this fluid from the reservoir is sucked via the check valve 62 opening to the inlet of the motor 22. In this the motor is in a bypass mode so that the working pressure difference across the motor 22 is reduced as described hereto before until the clutch 23 is disengaged, whereupon the valve is closed when the speed becomes zero.

To engage the clutch, the valve 60 is opened with the valve 61 closed so that the motor 2 receives fluid from the line 15 and the hydraulic pressure building up in the motor causes to engage the clutch 23. Thereafter the valve 61 is opened and the motor 22 starts to work. In case the valve 61 would be opened before the valve 60 is opened, the speed of the motor would become too high since the clutch is still disengaged in this condition. When the machine 22 operates in the motor mode to drive the vehicle or, respectively in the pump mode for energy recovery, the axial piston pump must comprise a swash plate which may be pivoted across the zero position to both directions, wherein the pivoting angle determines the volume of throughput.

When a reversible axial piston machine with a large throughput is selected according to FIG. 4, said machine having a large displacement volume for accelerating and decelerating the automotive drive shown in FIG. 1, the torque required for a steady drive may be delivered by a substantially smaller axial piston machine 20 with constant throughput and clutch 21. The amount of accelerating torque and braking torque of the reversible machine 22 is determined by adjusting the throughput.

For example, when a drive lever is actuated by the driver to accelerate the vehicle, the clutch 23 is first engaged, wherein the throughput of the machine 22 is still adjusted to zero. Further actuating the drive lever causes to continuously increase the throughput of the motor 22 up to the maximum volume. When the drive lever is still further actuated, the clutch 21 is engaged, wherein the throughput of the motor 22 is readjusted to zero at the same time, whereupon the throughput of the machine 22 starting from zero is continuously increased; still further actuating the drive lever results in that the machine 22 operates in addition to the machine 20 with maximum throughput in the maximum position of the drive lever. Depending on the position of the drive lever, the clutches 21 and 23 are thus actuated and the throughput of the motor 22 is varied. When the maximum throughput of the motor 22 equals the constant throughput of the motor 20, no discontinuity of torque results in activating the motor 20. The drive lever acting on the secondary unit 20 and 22 thus determines the performance of the vehicle. The torque $M_2$ delivered thus depends on the position of the drive lever and on the pressure in the line 15.

Correspondingly the clutch 23 is engaged when the brake lever is actuated, whereupon the brake torque generated by the machine 22 working in the pump mode is produced in response to further positioning the brake lever to increase the displacement volume of the pump until a maximum value is reached at which the clutch 21 is engaged, the machine 20 operating as a pump.

Figure 5:
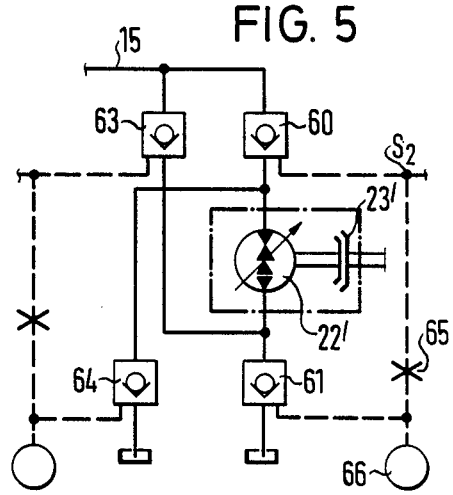

Instead of a reversible machine, a substantially smaller and lighter axial piston machine having a variable displacement volume to be adjusted in one direction only may be provided when the machine 22' including the clutch 23' is provided with a valve system shown in FIG. 5. In addition to the valves 60 and 61 which function has been explained in the description of FIG. 4, further pilot operated valves 63 and 64 are provided which are connected to the inlet and outlet of the machine 22 as shown. The machine 22' is provided to accelerate the vehicle in the forward and reverse drive as well as for producing braking energy during the forward and reverse drive. Accordingly the machine 22 operates in a four-quadrant-operation. For example, when the valves 60 and 61 are activated, the machine 22 accelerates in the motor mode and in a clockwise direction or, respectively decelerates in the pump mode and in a counter-clockwise run, whereas activating the valves 63 and 64 decelerate the machine 22' in the pump mode and clockwise run or, respectively accelerates the machine in the motor mode and counter-clockwise run.

FIG. 5 further shows how to realize the time delay between operating the valves 60 and 61. The delay time is defined by the disengaging or engaging time of the clutch 23. A throttle 65 and an accumulator 66 are provided in the control line for the pilot valve 61. For engaging the clutch, with the valves 60 and 61 closed, a signal $S_2$ on the control line opens the valve 60, whereas the valve 61 opens after a certain time delay after engagement of the clutch. Vice versa, to disengage the clutch, the signal $S_2$ is removed, whereby the valve 60 is immediately closed, whereas the valve 61 closes when the clutch is disengaged and the speed becomes zero. Possibly, the valve 61 may be actuated in response to speed. The time delay may be realized electrically by a RC-circuit when the valves are electrically controlled.

Figure 6:
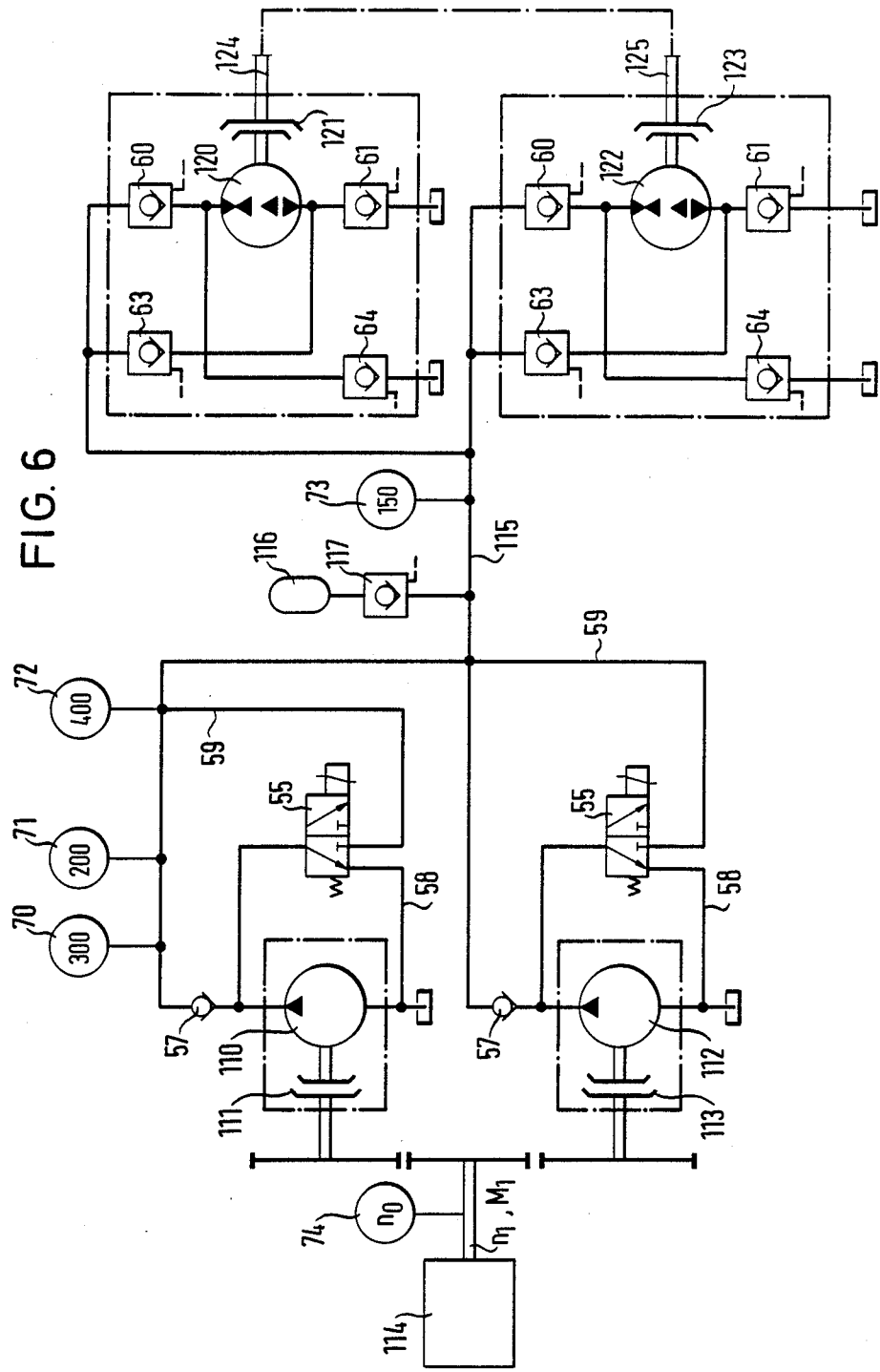

FIG. 6 shows a hydraulic diagram for a hydrostatic transmission comprising two pumps 110 and 112 each having an integrated clutch 111 and 113, as well as hydrostatic machines 120 and 122 each having an integrated clutch 121 and 123. The hydraulic accumulator 116 is connected to the line 115 through a valve 117. The pumps 110 and 111 are driven by a combustion engine 114. Valves are provided to actuate the clutches 111 and 113 in the manner described in conjunction with FIG. 3. Corresponding reference numerals are used. The same applies to the valve arrangement to actuate the clutches 121 and 123 of the machines 120 and 122. When the machines 120 and 122 have a constant but different throughput, the driven shafts operate on a common gear output via a gear connection which is not shown. Preferably, however, both machines have a varying throughput and are of same size. In this case the driven shaft 124 is connected to one wheel of a vehicle and the driven shaft 125 to the other wheel. As the driven shafts 124 and 125 each are connected to an individual wheel of the vehicle, the differential gear conventionally provided between the wheels may be eliminated. The machines 120 and 122 can be of the wheel hub type. In a single wheel drive both machines 120 and 122 must be provided with a varying displacement volume.

In the embodiment of FIG. 6 the displacement volumes of pumps 110 and 112 are selected to be in the ratio $V_{112}/V_{110} = 1.62$. Three different transmission modes result from actuating the clutches 111 and 113, wherein the torque is varied in the ratio of 1:1.62 when the pressure P has a predetermined value. For example, when the line pressure 115 exceeds 300 bar, the clutch 111 is engaged by the solenoid valve 55 and pump 110 only supplies fluid. When the pressure in the line 115 drops below 300 bar as the secondary fluid consumption is increased, the clutch 111 is disengaged and the clutch is engaged so that pump 110 is replaced by pump 112 having the higher displacement volume to feed fluid to the line 115. With the pressure still further decreasing and dropping to 200 bar, the pump 110 is activated by engaging the clutch 111 and now both pumps 110 and 112 supply fluid to the line 115.

The clutches 111 and 113 of the pumps 110 and 112 are thus actuated in response to pressure. A pressure switch 70 is activated when the pressure is higher or lower than 300 bar, whereas a further pressure switch 71 is actuated when the pressure is above or below 200 bar. The pressure switches 70 and 71 control a device not shown to initiate the actuation of the clutches 111 and 113 in the manner described.

The accumulator 116 compensates for the energy balance when the load requires more or less than the power available.

Accordingly, the hydraulic power delivered by the pumps 110 and/or 112 is accumulated in the accumulator 116 and the pressure P is increased when the load requires no torque. When a maximum working pressure of 400 bar is reached, the pressure switch 37 delivers a signal to disengage both pumps and to adjust the combustion engine to idle speed.

FIG. 6 further shows that the transmission is able to be operated in accordance with the motor 120, the motor 122 or both motors operating and supplied by pump 110, pump 112 or both pumps together.

Figure 7:
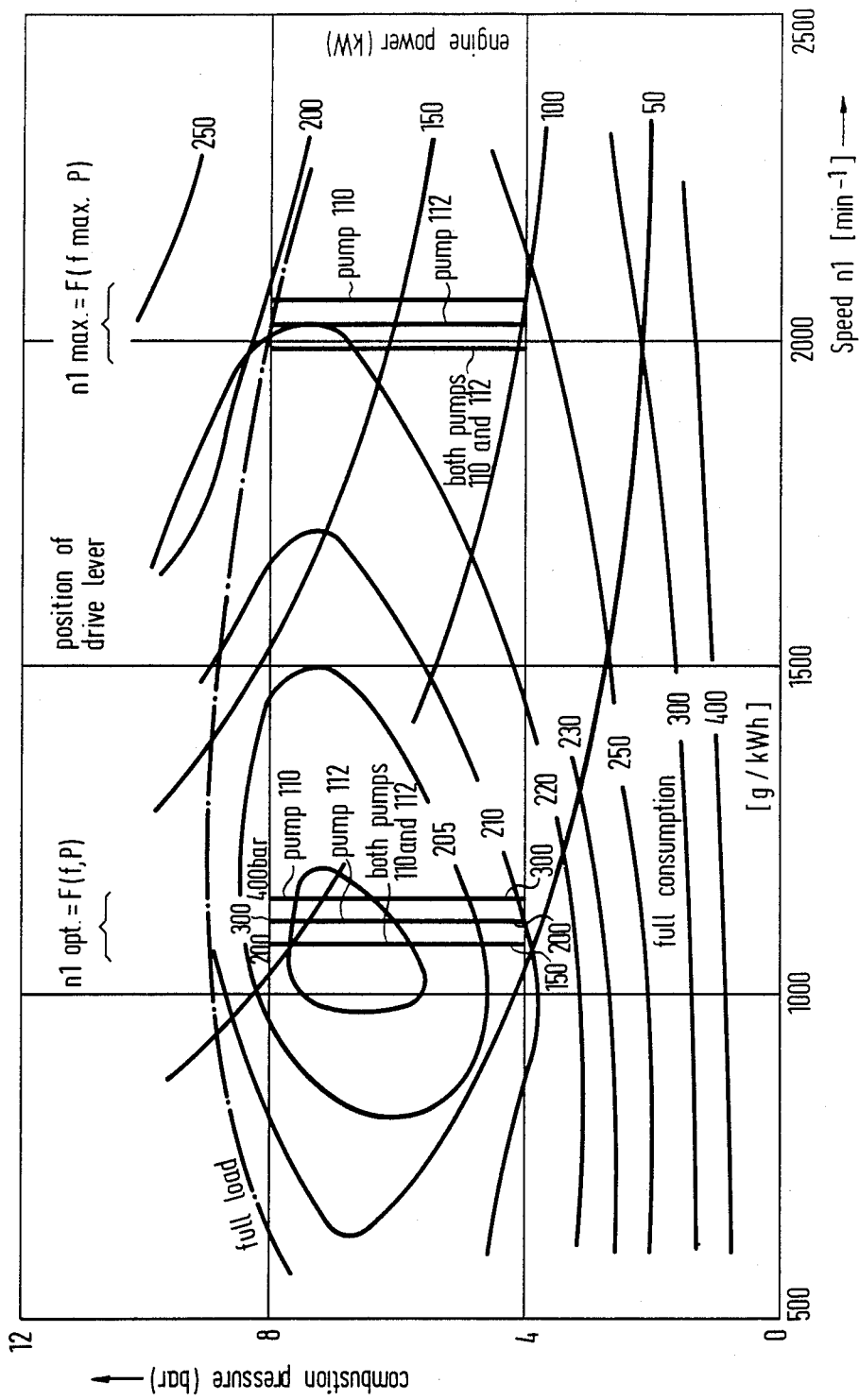

FIG. 7 is a graph showing the fuel consumption of a combustion engine depending on the speed $n_1$ and a medium combustion pressure. The graph further shows how to adjust the speed $n_1$ of the combustion engine in an optimum range of fuel consumption in response to the position of the drive lever selecting the speed $n_2$ of the output.

As described above, the clutch 123 has been engaged by actuating the drive lever to operate the motor 122, while the motor 120 is out of operation. Since the output torque of the motor 122 is increased, the pressure drops from initially 400 bar to 300 bar, the pressure switch 70 is actuated to change the operation from pump 110 to 112 which receives a larger torque $M_1$ from the combustion engine to deliver an increased flow of fluid to the line 115. When the pressure further drops to 200 bar, the pressure switch 71 is actuated and activates pump 110, now both pumps supplying fluid to the line 115. The graph in FIG. 7 shows that the power required by the driver in selecting the drive lever is fulfilled by actuating the clutches of the pumps 110 and 112 such that the combustion engine operates with a nearly constant speed $n_1$ and in the optimum range of the combustion pressure and thus in an optimum range of the fuel consumption. A speed-controlled injection pump may be provided to maintain the speed $n_1$ at an optimum value so that the engine power may be maintained nearly constant independent of the working pressure in the line 115.

When a high vehicular speed is required by the driver, the working pressure further drops even when both pumps 110 and 112 are in operation. For example, when the pressure falls below 150 bar, the pressure switch 73 of FIG. 6 is actuated to increase the speed $n_1$ of the combustion engine. Increasing the speed may take place in response to the pressure and the position of the drive lever to increase the engine speed when the working pressure falls and with the drive lever positioned towards its maximum position. In this way, the vehicle may be operated with the highest possible output speed $n_2$, when the throughput of both motors 120 and 122 is at a maximum, wherein the pressure in line 115 is relatively small by increasing the speed $n_1$ of the combustion engine in response to pressure as well as according to the position of the drive lever.

On the other side, the torque requirement of the motors 120 and 122 requires a very high working pressure with the vehicle going uphill or passing by while going uphill. Increasing the working pressure is forced in response to pressure and according to the position of the drive lever. When the working pressure drops below 160 bar, while the drive lever is shifted to its maximum position, the speed $n_1$ of the engine is increased until the required working pressure up to the maximum system pressure is built up in the line 115.

Activating either pump 110 or 112 in response to pressure according to driver's control in adjusting the drive lever takes place in the manner explained. This operation is shown in FIG. 7 for an increased speed of around 2000 upm of the engine.

The same applies to fully accelerate the vehicle from a standstill when the drive lever is fully displaced to the maximum position. This adjusts the engine to maximum speed. According to working pressure one or both pumps are activated and both clutches 121 and 123 are engaged. When the maximum power delivered by the engine is not transmitted to the wheels, the excess energy charges the accumulator 116. As the working pressure increases, the accelerating torque and power available for acceleration is increased. For example, the maximum output torque $M_2$ can be up to 9 times larger than the nominal output torque at maximum vehicular speed and maximum output power. The drive lever is released when the desired speed is reached. Accordingly the engine speed drops to a value being in the optimum range of consumption, one of the clutches 121 or 123 is disengaged and drive power and output power are adjusted in response to the position of the drive lever at a lower working pressure so that optimum efficiency of the transmission is obtained.

Besides the pressure values 160 and 150 bar of the pressure control 73 to increase the speed $n_1$, a further operation can be initiated when the working pressure drops off too far, for example below 120 bar. To avoid this, the clutch 123 may be disengaged in this case for example. Accordingly the torque is reduced to the torque generated by the motor 120 when the torque required is not available. Furthermore, a speed responsive switch 74 is provided to adjust the volume delivered by the pumps 110, 112 to a mimimum when the engine 114 is idling. For example, the smaller pump only is maintained in operation. In this case, the particular pump may be of the adjustable type which is controlled to deliver the smallest possible volume when the switch 74 operates. Still further, the primary and secondary clutches may be actuated in response to speed when the drop of engine speed is too high due to an excessive load torque.

Figure 8:
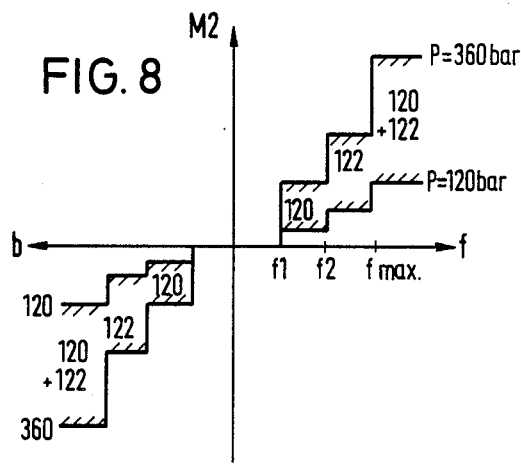
FIG. 7 is a diagramm showing the clutch operation of the primary pumps in response to the working pressure and the drive lever position when the drive engine is a combustion engine and FIG. 8 shows a diagramm of the output torque in response to the working pressure and the drive lever position.

The graph of FIG. 8 shows the different values of the output torque $M_2$ in response to the drive lever position f. The output torque $M_2$ increases with increasing values f in three steps corresponding to activating the motor 120 of smaller power or activating the motor 122 of larger power or both motors 120 and 122. The output torque $M_2$ is further varied in response to the working pressure P which variation in time depends on the position f and the output speed $n_2$. FIG. 8 shows the working pressure limits possible for different drive lever positions. When the secondary motors are of the type with adjustable displacement volume, a certain pressure P may be adjusted in each drive lever position and the transmission may be controlled more sensitive in accordance with the requirement of output torque $M_2$.

The graph of FIG. 8 further shows the torque when a brake lever b is actuated to brake the vehicle by operating the machines 120 and 122 in the pump mode for energy recovery. In braking, a switch sensing the position of the brake lever reduces the engine speed to idle speed, furthermore, both pumps 110 and 112 are deactivated by disengaging the clutches 111 and 113 and one or both machines 120,122 operate depending on the position of the brake lever b, wherein the accumulator 116 is charged by the recovered energy.

When neither the driver lever nor the brake lever are actuated with the vehicle coasting, the engine 114 is automatically reset to idle speed and all clutches disengaged to avoid idle losses of the machines. Possibly the smaller pump 110 is maintained in operation. The pilot-operated check valve 117 prevents the accumulator from being discharged.

What is claimed is:

1. A hydraulic transmission to permit a drive engine to operate in a range of optimum fuel efficiency comprising a primary unit having a plurality of hydrostatic pumps driven by said drive engine to supply fluid from a reservoir to a pressure line, first clutch means disposed between said drive engine and at least one of said hydrostatic pumps of said primary unit, means for automatically actuating said first clutch means in response to the pressure in said pressure line, an accumulator communicating with said pressure line for accumulating fluid, a second unit connected to said pressure line having a plurality of hydrostatic machines, said secondary unit operable to provide a drive torque to a load in a first operating mode, said secondary unit further operable to provide a braking torque to said load in a second operating mode, second clutch means disposed between said load and at least one of said hydrostatic machines of said secondary unit, means for actuating said second clutch means in response to the desired torque to be delivered by said hydrostatic machines to said load, said first and said second clutch means being actuated by the pressure generated in said transmission, at least one of said hydrostatic machines comprising an axial piston type hydrostatic machine of the bent axis design having a plurality of pistons and a drive shaft, said axial piston type hydrostatic machine including, an inlet port for receiving fluid, an outlet port for delivering fluid, a conical friction clutch disposed between said drive shaft and said pistons, a swash plate cooperating with the pistons defining the drive flange of said conical friction clutch, said drive shaft defining the driven clutch member of said conical friction clutch, said conical friction clutch being automatically actuated by hydraulic pressure forces generated in said machine.

2. The transmission of claim 1, wherein said transmission further comprises a control valve operable to disengage said axial piston type hydrostatic machine by connecting the inlet port of said axial piston type hydrostatic machine to the outlet port of said axial piston type hydrostatic machine.

3. The transmission of claim 1, wherein said axial piston type hydrostatic machine engages said conical friction clutch upon receipt of counterpressure by said outer port.

4. The transmission of claim 1, wherein said transmission further includes a ⅜ directional control valve having a first position to by-pass said axial piston type hydrostatic machine and having a second position to connect the outlet port of said axial piston type hydrostatic machine to said pressure line.

5. The transmission of claim 1, wherein the outlet port of said axial piston type hydrostatic machine is connected to said pressure line through a first valve, and the outlet port of said axial piston type hydrostatic machine is connected to the reservoir through a second valve.

6. The transmission of claim 5, wherein the activation of said first and second valves determines whether said secondary unit is operating in which of said first and second operating modes.

7. The transmission of claim 6, wherein said transmission delays the actuation of said second valve until after actuation of said first valve when said conical friction clutch is to be engaged.

8. The transmission of claim 7, wherein said first and second valves are pilot-operated check valves.

* * * * *